UNITED STATES PATENT OFFICE.

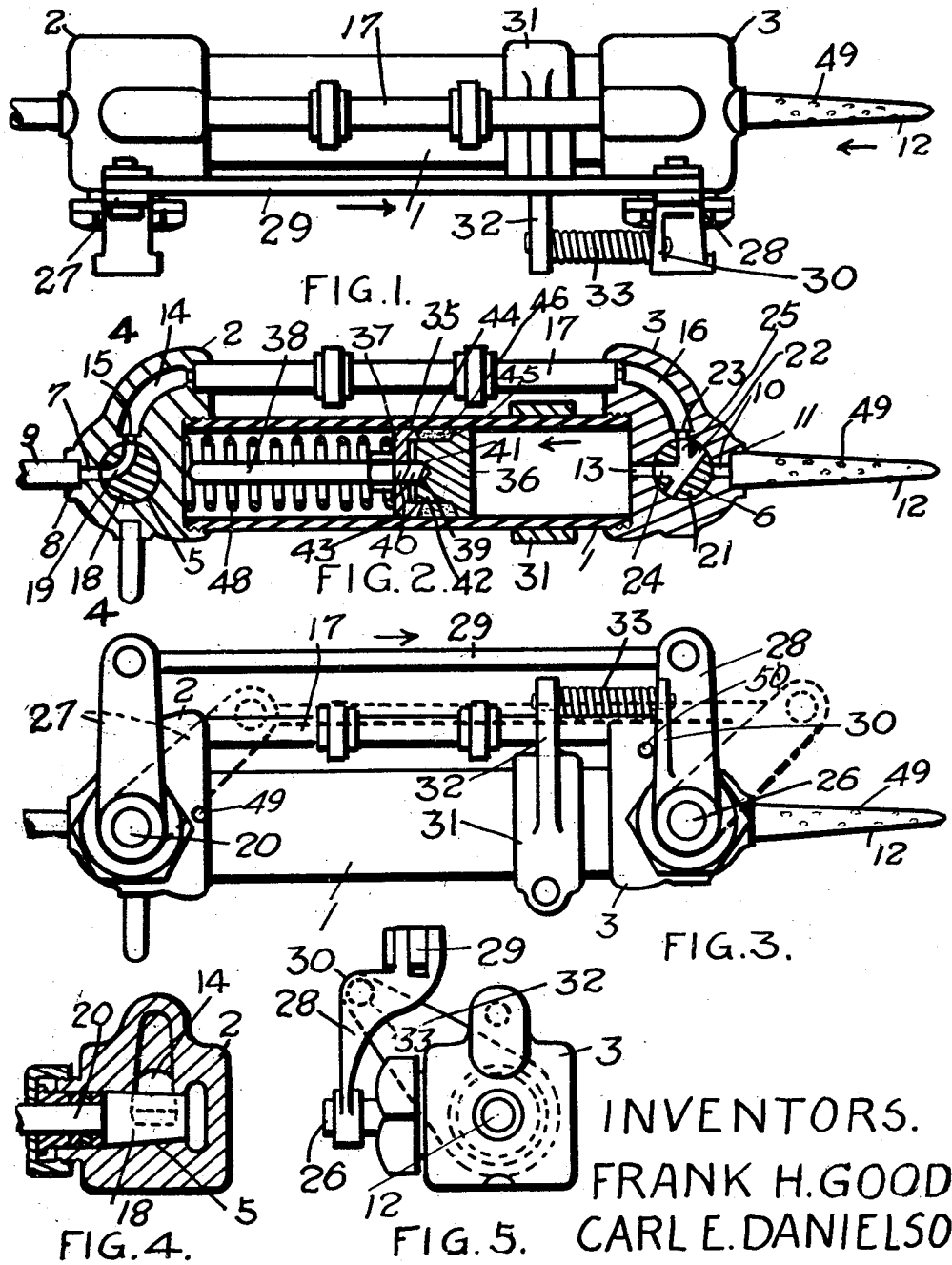

FRANK HOYZE GOOD, OF HAMILTON, AND CARL ENGNAR DANIELSON AND FREDERICK PELLING, OF BRANTFORD, ONTARIO, CANADA.

MEAT-CURING INJECTOR.

1,370,788.  Specification of Letters Patent.  Patented Mar. 8, 1921.

Application filed July 21, 1919. Serial No. 312,401.

*To all whom it may concern:*

Be it known that we, FRANK HOYZE GOOD, of the city of Hamilton, in the county of Wentworth, assistant superintendent, CARL ENGNAR DANIELSON, of the city of Brantford, in the county of Brant, assistant superintendent, and FREDERICK PELLING, of the city of Brantford, in the county of Brant, chief draftsman, all in the Province of Ontario, Canada, have invented certain new and useful Improvements in Meat-Curing Injectors, of which the following is the specification.

Our invention relates to improvements in meat curing injectors and the object of the invention is to devise means for injecting pickling fluid while under pressure into meats for the purpose of curing the same and it consists essentially of the arrangement and construction of parts as hereinafter more particularly explained.

Figure 1 is a plan view of our injector.

Fig. 2 is a longitudinal section through Fig. 1.

Fig. 3 is a side elevation of our injector.

Fig. 4 is a sectional view on line 4—4, Fig. 2.

Fig. 5 is an end elevation looking in the direction of arrow, Fig. 1.

In the drawings like characters of reference indicate corresponding parts in the various figures.

1 indicates a cylinder provided with heads 2 and 3. The head 2 is provided with a valve bore 5 and the head 3 with a valve bore 6. The head 2 is also provided with an inlet orifice 7 extending from the outer end of the head into the bore 5 the outer end of such orifice being enlarged at 8 to receive the supply pipe 9 which leads from the supply tank in which the fluid is held under pressure. The head 3 is provided with an outlet orifice 10 extending from the bore 6 and having an enlarged outer end 11 in which is secured a nozzle 12 such nozzle being preferably provided with a threaded end which is screwed into the corresponding thread formed in the interior of the orifice enlargement 11. 13 is an orifice in longitudinal alinement with the orifice 10 and extending from the diametrically opposite side of the bore 6 through the inner face of the head.

The head 2 is also provided with a curved passageway 14 leading from the orifice 15 which enters the bore 5 at a point at right angles to the orifice 7. The head 3 is provided with a similar passageway 16 and an orifice 23 located at right angles to the orifice 13 in the bore 6. The inner ends of the passages 14 and 16 are connected together by a pipe 17. 18 is a valve plug turnably held within the bore 5 and provided with a passageway 19 adapted to connect the orifices 7 and 15 together to form continuous passageway between the supply pipe 9 and passageway 14. 20 is the stem of the valve plug 18. 21 is a valve plug turnably held in the bore 6 and provided with diametrically extending passageway 22 from which extends branch passageways 23 and 24.

In the normal position of the valve the outer end of the passageway 23 registers with the orifice 25 formed at the inner end of the passageway 16. The branch 24 in the normal position of the valve registers with the orifice 13 the passageway 22 having its ends closed. 26 is the stem of the valve plug 21.

27 is a lever secured to the stem 20 and 28 is a lever secured to the stem 26. The outer ends of the levers 27 and 28 are connected together by the link rod 29. The lever 28 is provided with an outwardly extending flange 30. 31 is a collar which is clamped on the cylinder 1 intermediately of its length, 32 is an arm which extends from the collar 31 the outer end of the arm being opposite the outer portion of the flange 30. 33 is a tension spring connecting the arm 32 and flange 30 together. 35 is a piston head fitted within the cylinder 1 and comprising members 36 and 37 connected together by a stem 38 which is provided with a threaded inner end 39 which passes freely through the orifices 40 in the member 37 and is secured into the orifice 41 in the member 36.

It will be noticed that the member 36 is provided with a reduced portion 42 and that the member 37 is provided with an annular flange 43 into which the extreme end of the reduced portion 42 fits. The outer face of the flange 43 is beveled outwardly at 44 and the opposing portion of the member 36 is beveled at 45 in the opposing direction. Between the beveled portions 44 and 45 fits the packing ring 46 of suitably resilient material. The stem 38 of the piston extends in its normal position in proximity to the inner face of the head 2 thereby forming a stop limiting the movement of the piston head. 48 is a spiral spring extending between the piston head 36 and the inner face of the cylinder head 2. The nozzle 12 is provided with suitably arranged perforations 49 through which the pickling fluid passes with the nozzle forced into the body of meat such nozzle being provided with a pointed end to allow it to easily enter the meat.

When the parts are in the position shown in the drawing the fluid enters from the supply tank through the supply pipe 9, orifice 7, valve passage 19, orifice 15, passage 14, through the pipe 17, passage 16, orifice 25, branch passages 23 and 24 and orifice 13 into the cylinder 1 such fluid forcing the piston 35 in the direction of arrow (see Fig. 2) against the pressure of the spring 48 until the end of the stem 38 strikes against the inner face of the cylinder head 2. When this takes place the cylinder is provided with a charge of fluid. The link rod 29 is then forced manually in the direction of arrow carrying such link and the arms 27 and 28 into the dotted position shown in Fig. 3. When in this position the valve plug 18 is turned out of alinement with the orifices 7 and 15 thereby cutting off the fluid flow through the valve. Simultaneously the valve plug 21 is turned so that the passageways 23 and 24 are carried out of alinement with the orifices 25 and 13. At the same time, however, the valve plug 21 is turned sufficiently to carry the ends of the diametric passage 22 into longitudinal alinement with the orifices 13 and 10. The fluid within the cylinder 1 is then forced from the cylinder by means of the springs 48 through the orifice 13, passageway 22 and orifice 10 into the nozzle 12 and through the perforations 49 into the body of meat into which the nozzle has been forced as previously described.

When the charge of pickling fluid has been forced into the meat the link 29 is carried back into the position shown in full lines by the tension spring 33 which has been forced into tension by the previous operation thereby allowing the fresh charge of pickling fluid to pass into the cylinder 1.

49 and 50 are pins for limiting the movement of the valve levers 27 and 28 as they are carried back to their normal position by the spring 33.

From this description it will be seen that we have devised a very simple device by which pickling fluid is forced into a body of meat while under pressure so that it may thoroughly permeate the whole of such body.

What we claim as our invention is:

1. A hypodermic injector comprising a cylinder, a spring pressed piston operating therein, a supply pipe for introducing fluid under pressure into the cylinder against the face of said piston, a discharge nozzle for dispensing the fluid contents of the cylinder, and valve means operable to establish connection between the supply pipe and the interior of the cylinder, or between the discharge nozzle and the interior of the cylinder.

2. A hypodermic injector comprising a cylinder, cylinder heads closing the ends of the cylinder, a spring pressed piston operating in said cylinder, one of said heads being provided with a valve bore and a discharge passage in communication with the interior of the cylinder, a discharge nozzle carried by said head in communication with said bore, a valve in said bore, the remaining cylinder head being provided with a valve bore having a valve therein, a supply pipe communicating with said valve bore, and a conduit extending between the first and last mentioned valve bores.

3. A hypodermic injector comprising a cylinder, valve heads closing the ends of said cylinder, a spring pressed piston operating in said cylinder, a supply pipe connected to one of said heads, a conduit extending between said heads and a discharge nozzle connected to the other head, the valve in one of the heads being operable to control communication between the supply pipe and the conduit extending between the heads and the valve in the remaining head being operable to establish communication between the conduit extending between the heads and the interior of the cylinder or between the interior of the cylinder and the discharge nozzle.

FRANK HOYZE GOOD.
CARL ENGNAR DANIELSON.
FREDERICK PELLING.

Witnesses:
GERTRUDE NICHOLSON,
JOHN G. HAYWARD.